(12) United States Patent
Iyer et al.

(10) Patent No.: US 12,278,713 B2
(45) Date of Patent: Apr. 15, 2025

(54) FILTERING VLAN PACKETS HAVING MALFORMED TPIDS

(71) Applicant: Arista Networks, Inc., Santa Clara, CA (US)

(72) Inventors: Anirudh Ramesh Iyer, Bangalore (IN); Satish Kumar Selvaraj, San Jose, CA (US); Akhil Ojha, Bangalore (IN); Purushothaman Nandakumaran, Milpitas, CA (US); Aman Aman-Ul-Haq, Vancouver (CA); Jyothish Kunkumath, Bangalore (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 27 days.

(21) Appl. No.: 17/565,236

(22) Filed: Dec. 29, 2021

(65) Prior Publication Data

US 2023/0147422 A1    May 11, 2023

(30) Foreign Application Priority Data

Oct. 26, 2021 (IN) .............................. 202141048769

(51) Int. Cl.
| | |
|---|---|
| H04L 12/46 | (2006.01) |
| H04L 47/20 | (2022.01) |
| H04L 47/31 | (2022.01) |
| H04L 47/32 | (2022.01) |

(52) U.S. Cl.
CPC ............ *H04L 12/465* (2013.01); *H04L 47/20* (2013.01); *H04L 47/31* (2013.01); *H04L 47/32* (2013.01)

(58) Field of Classification Search
None
See application file for complete search history.

(56) References Cited

U.S. PATENT DOCUMENTS

| | | | |
|---|---|---|---|
| 6,904,043 B1* | 6/2005 | Merchant | H04L 49/351 370/428 |
| 10,148,459 B2 | 12/2018 | Chiu et al. | |
| 10,432,527 B1* | 10/2019 | Bosshart | H04L 49/101 |
| 2007/0171838 A1* | 7/2007 | Baden | H04L 49/901 370/252 |
| 2008/0288638 A1* | 11/2008 | Diab | H04N 9/8042 709/225 |

(Continued)

FOREIGN PATENT DOCUMENTS

WO       2018055654 A1     3/2018

OTHER PUBLICATIONS

International Search Report and Written Opinion mailed Mar. 30, 2023, Application No. PCT/US2022/078636, 17 pages.

(Continued)

*Primary Examiner* — Jason E Mattis
*Assistant Examiner* — Bao G Nguyen
(74) *Attorney, Agent, or Firm* — Fountainhead Law Group, PC (57) ABSTRACT

Malformed VLAN packets can be detected by programming suitable rules in a TCAM in the packet processing pipeline. In some deployments, for example, the TCAM rule(s) can match on the parsed EtherType metadata. More specifically, the match can be based on the EtherType metadata being set to a value equal to known VLAN TPIDs, such as 0x8100, 0x88a8, rather than being set to a standard EtherType.

20 Claims, 10 Drawing Sheets

(56) References Cited

U.S. PATENT DOCUMENTS

| | | | | |
|---|---|---|---|---|
| 2013/0136117 A1* | 5/2013 | Schrum, Jr. | .............. | H04B 3/54 |
| | | | | 370/338 |
| 2014/0351878 A1 | 11/2014 | Zegman et al. | | |
| 2015/0110113 A1* | 4/2015 | Levy | ....................... | H04L 69/18 |
| | | | | 370/392 |
| 2018/0219798 A1* | 8/2018 | Dutil | ................... | H04L 67/1097 |

OTHER PUBLICATIONS

Patent Cooperation Treaty, International Preliminary Report on Patentability, PCT App. No. PCT/US2022/08636, dated Apr. 30, 2024, 10 pgs.

* cited by examiner

TCAM, 1500

| | match criteria | action(s) field | |
|---|---|---|---|
| 0 | UDF1 == 0x8100 | DROP | ⟵ rule, 1502 |
| 1 | UDF2 == 0x88a8 | DROP | ⟵ rule, 1504 |
| 2 | UDF1 == 0x8100 && UDF2 == 0x8100 | DROP | ⟵ rule, 1506 |
| ... | | | |

FIG. 16

TCAM, 1600

| | match criteria | action(s) field | |
|---|---|---|---|
| 0 | EtherType metadata == 0x88a8 | DROP | ⟵ rule, 1602 |
| 1 | EtherType metadata == 0x8100 | DROP | ⟵ rule, 1604 |
| 2 | UDF1 == 0x8100 | DROP | ⟵ rule, 1606 |
| | UDF1 == 0x8100 && UDF2 == 0x8100 | DROP | ⟵ rule, 1608 |
| ... | | | |

FILTERING VLAN PACKETS HAVING MALFORMED TPIDS

CROSS REFERENCE TO RELATED APPLICATIONS

Pursuant to 35 U.S.C. § 119 (a), this application is entitled to and claims the benefit of the filing date of India Provisional Patent Application No. 202141048769, filed Oct. 26, 2021 in India, the content of which is incorporated herein by reference in its entirety for all purposes.

BACKGROUND

The packet processing pipeline in a network device (e.g., switch, router, etc.) includes a parsing stage (parser) to parse an ingress packet and extract information (packet data and metadata) from the various fields of the packet. The metadata can be used in the downstream stages of the pipeline to further process the packet. When the parser is presented with a malformed packet, the malformed packet may be parsed incorrectly. The resulting metadata that is parsed from the malformed packet is likely to be garbled and otherwise meaningless. In some cases, the downstream stages of the pipeline can detect the garbled metadata and reject the malformed packet. In other cases, the downstream stages may not detect that the metadata is incorrect and hence may continue processing the packet not knowing the packet is malformed. This represents a potential exploit, where packets can be intentionally malformed in an attempt to bypass security features provided in the network device.

Packets on a virtual local area network (VLAN), for example, can be malformed in various ways. For instance, VLAN packets that contain more than two VLAN tags can be considered malformed. VLAN packets having unexpected tag protocol identifiers (TPIDs) can be deemed to be malformed. As noted above, a malformed packet can cause the parser to misclassify the packet, resulting in garbled metadata. In some cases, the metadata generated by parsing a malformed VLAN packet may not trigger or alert the downstream pipeline stages of the presence of the malformed packet. Continued processing of the malformed VLAN packet can have catastrophic results in a customer's networks. For example, the misclassified packet may be labeled as a Layer 2 (L2) packet, which could cause the network device to simply switch the packet. In such a case, if the network device does not implement L2 access control lists (ACLs, e.g., port ACLs, MAC ACLs, etc.) or other suitable L2 security features to filter the malformed packet, the packet will be forwarded which can lead to breaches in security and other security related issues in the customer's deployment.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

For discussion purposes to illustrate aspects of the present disclosure, examples of packets will use the Ethernet II framing format. Ethernet II frames are known and well understood, and defined in accordance with various Institute of Electronics and Electrical Engineers (IEEE) networking standards. Packets can be untagged, single-tagged, and multi-tagged (e.g., double, triple, etc.).

Figure 1:
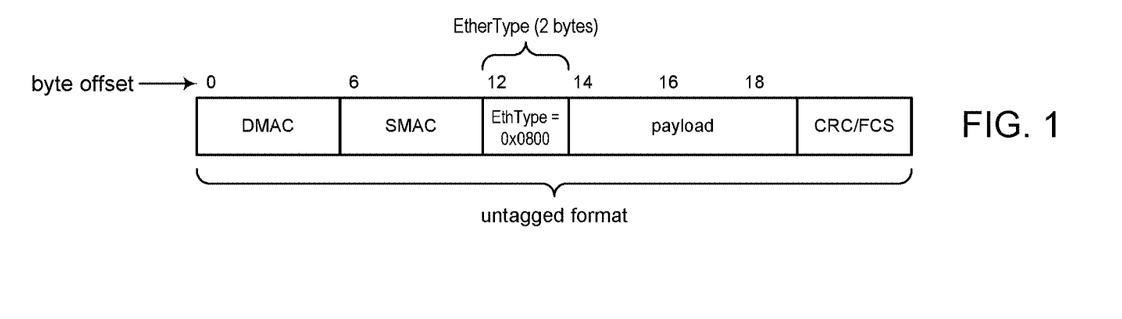
FIG. 1 shows the format for an untagged VLAN packet.

FIG. 1 shows the format for an untagged packet (Ethernet II frame). An untagged packet includes a destination media access control (DMAC) address that begins at byte offset 0 (byte 0), a source MAC (SMAC) address that begins at byte 6, an EtherType field at byte 12, and a payload that begins at byte 14. In a properly formed Ethernet II frame, the 2-byte EtherType field is expected to begin at offset 12 indicates the type of protocol that is encapsulated in the payload of the frame. A value of 0x800 in the EtherType field indicates that the payload contains an Internet Protocol v4 (IPv4) datagram. A value of 0x86dd indicates the payload contains an IPV6 datagram. Other EtherTypes are defined per various IEEE networking standards. For discussion purposes, the examples will use the EtherType for IPV4 datagrams, namely EtherType equals 0x0800.

Figure 2:
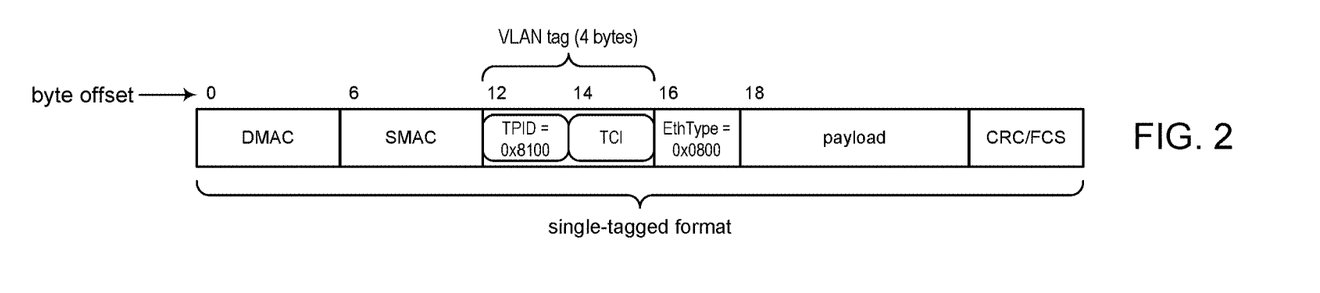
FIG. 2 shows the format for a single-tagged VLAN packet.

FIG. 2 shows the format for a single-tagged VLAN packet. VLAN and VLAN packet formats are known and well understood, and defined in accordance with various IEEE networking standards. In the case of a single-tagged VLAN packet, a 4-byte VLAN tag is located between the SMAC address and the Ethertype field. Accordingly in a properly formed Ethernet II frame, the VLAN tag should begin at byte 12 and span four bytes. The EtherType field follows the VLAN tag and is pushed further down in the packet, occupying bytes 16 and 17 in the packet. The VLAN tag comprises two fields: a 2-byte TPID field and a 2-byte tag control information (TCI) field. The TCI field contains, among other information, the VLAN identifier.

The TPID serves to indicate that the frame is a VLAN packet. TPIDs are standardized according to various IEEE networking standards. For example, a TPID value of 0x8100 indicates the packet is a VLAN packet that is tagged in accordance with 802.1q (dot1q) which is an IEEE networking standard that defines VLAN tags.

Comparing FIG. 1 and FIG. 2, it can be seen that an untagged frame can be distinguished from a dot1q (single-tagged) frame by looking at the 16-bit word that begins at byte 12 in the frame. For example, if bytes 12:13 in the frame is 0x800, then the packet is deemed to be untagged; if bytes 12:13==0x8100, the packet is deemed to be a single-tagged VLAN packet.

Figure 3:
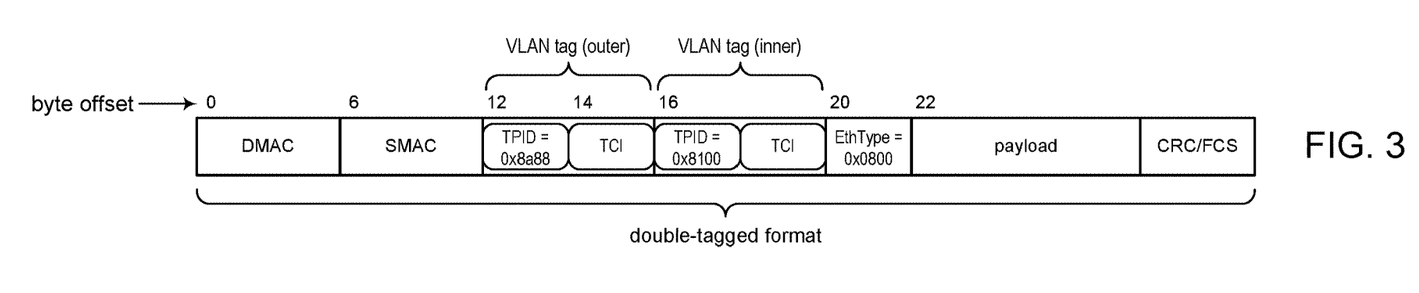
FIG. 3 shows the format for a double-tagged VLAN packet.

FIG. 3 shows the format for a double-tagged VLAN packet. The outer VLAN tag begins at byte 12 and the inner VLAN tag begins at byte 16. In a properly formed Ethernet II frame, the EtherType field should occupy bytes 20:21. The TPID in the outer VLAN tag can be 0x8a88 to indicate the packet is tagged in accordance with 802.1ad (dotlad), the IEEE networking standard for double-tagged VLAN packets (also referred to as QinQ and VLAN stacking). The TPID in the inner VLAN tag can be 0x8100 to indicate that the payload contains a single-tagged VLAN packet.

Figure 4:
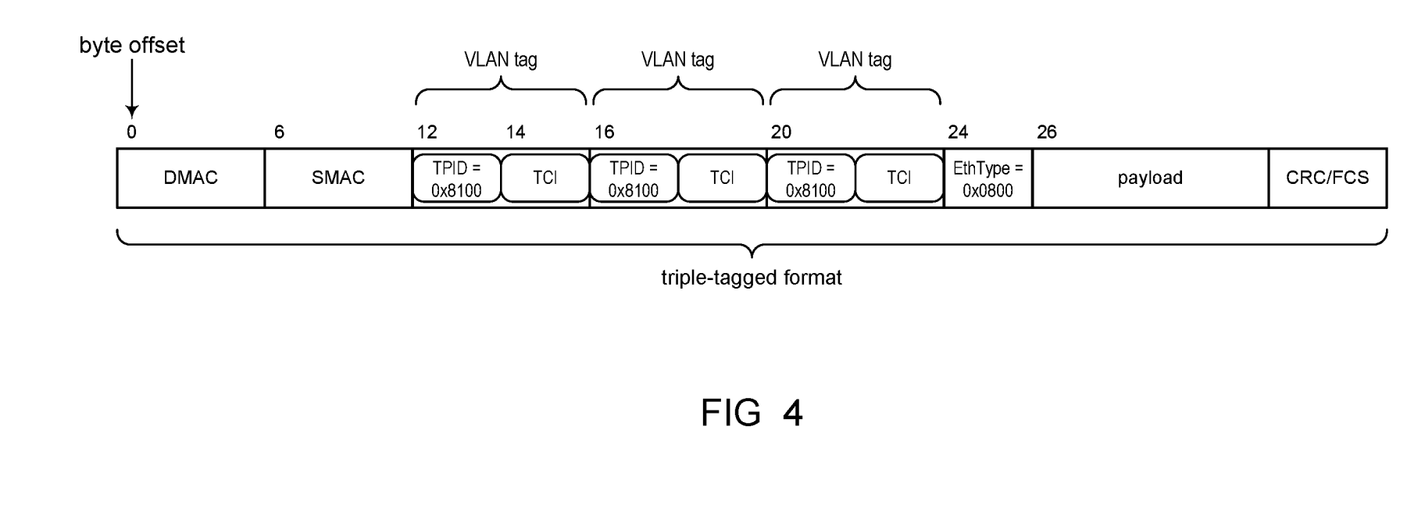
FIG. 4 shows the format for a triple-tagged VLAN packet.

Referring to FIG. 4, the present disclosure is applicable to VLAN tagged packets having more than two stacked VLAN tags. For example, FIG. 4 shows a triple-tagged VLAN packet.

Figure 5:
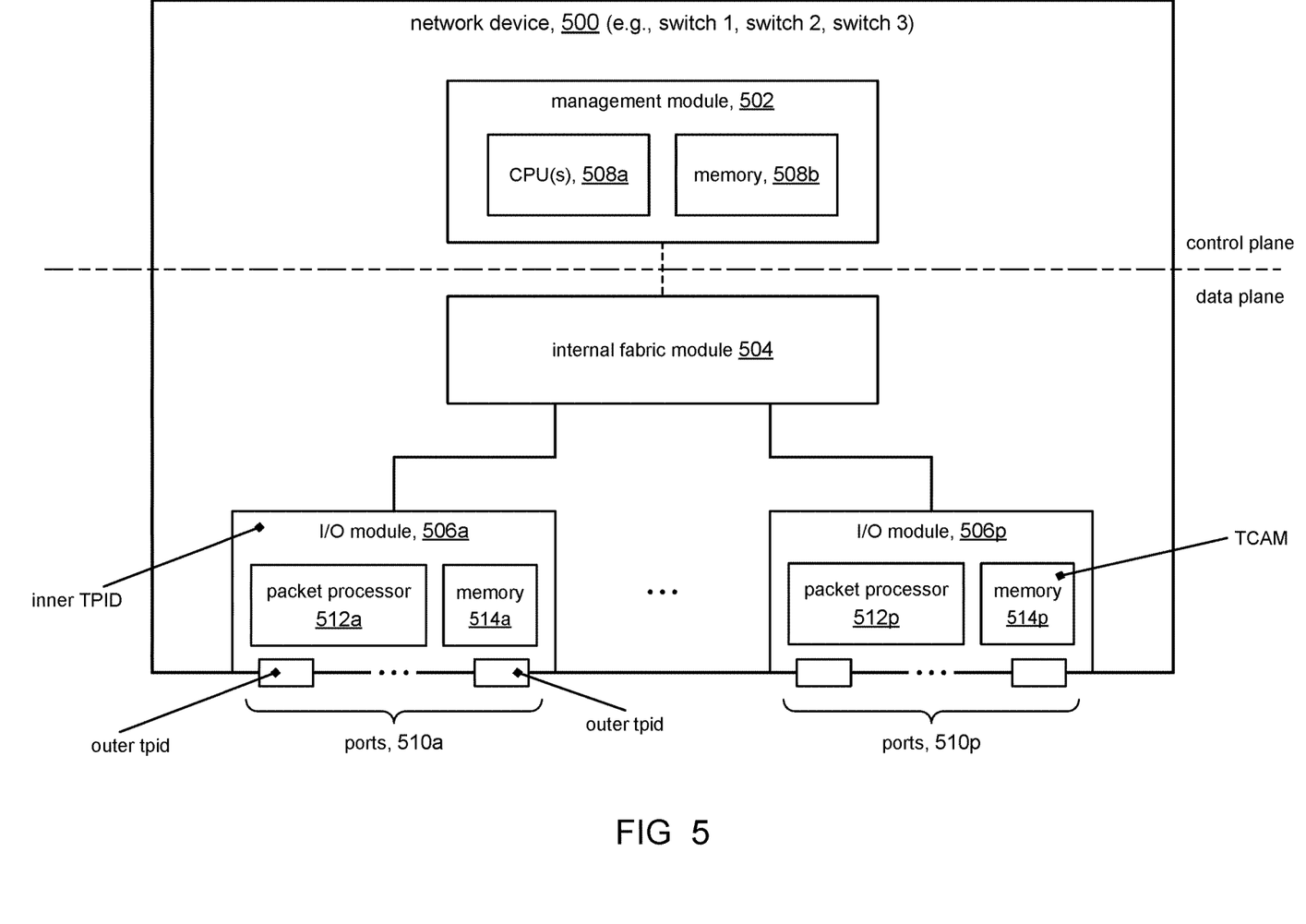
FIG. 5 shows an illustrative network device.

FIG. 5 depicts an example of a network device 500 in accordance with some embodiments of the present disclosure. As shown, network device 500 includes a management module 502, an internal fabric module 504, and a number of I/O modules 506a-506p. Management module 502 includes the control plane (also referred to as control layer) of network device 500 and can include one or more management CPUs 508a for managing and controlling operation of network device 500 in accordance with the present disclosure. Each management CPU 508a can be a general purpose processor, such as but not limited to an Intel®/AMD® x86 or ARM® processor, that operates under the control of software stored in a memory 508b, such as dynamic random access memory (DRAM). Control plane refers to all the functions and processes that determine which path to use, such as routing protocols, spanning tree, and the like.

Internal fabric module 504 and I/O modules (chips) 506a-506p collectively represent the data plane of network device 500 (also referred to as data layer, forwarding plane, etc.). Internal fabric module 504 is configured to interconnect the various other modules of network device 500. Each I/O module 506a-506p includes a respective set of input/output (I/O) ports 510a-510p which collectively constitute the ports of the network device for sending and receiving network packets. Each I/O module (chip) can be associated with an inner TPID where the inner TPID applies to all ports on the I/O module. Each port in an I/O module can be assigned or otherwise associated with a user-configurable (e.g., software programmable) outer TPID. The inner and outer TPIDs are discussed further below.

Each I/O module 506a-506p can include a packet processor 512a-512p and a respective memory component 514a-514p. Each packet processor 512a-512p can comprise a forwarding pipeline (e.g., application specific integrated circuit (ASIC), field programmable array (FPGA), digital processing unit, graphics coprocessors, content-addressable memory, and the like) configured to make decisions on how to process incoming (ingress) and outgoing (egress) network packets. Each memory component 514a-514p can include a ternary content-addressable memory (TCAM) to store rules, specified in accordance with the present disclosure, for processing or filtering packets.

Figure 6:
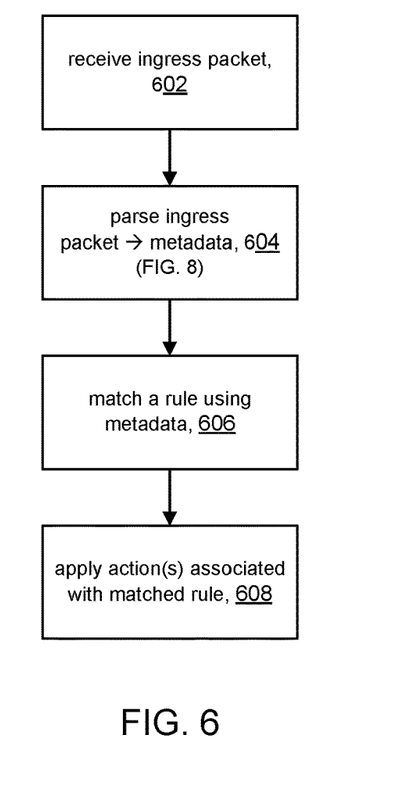
FIG. 6 shows an example of a flow for processing an ingress packet.

Referring to FIG. 6, the discussion will now turn to a high-level description of processing in a network device (e.g., 500, FIG. 5), and in particular a packet processor (e.g., 512a) in the network device, for receiving and processing a packet in accordance with the present disclosure.

Figure 7:
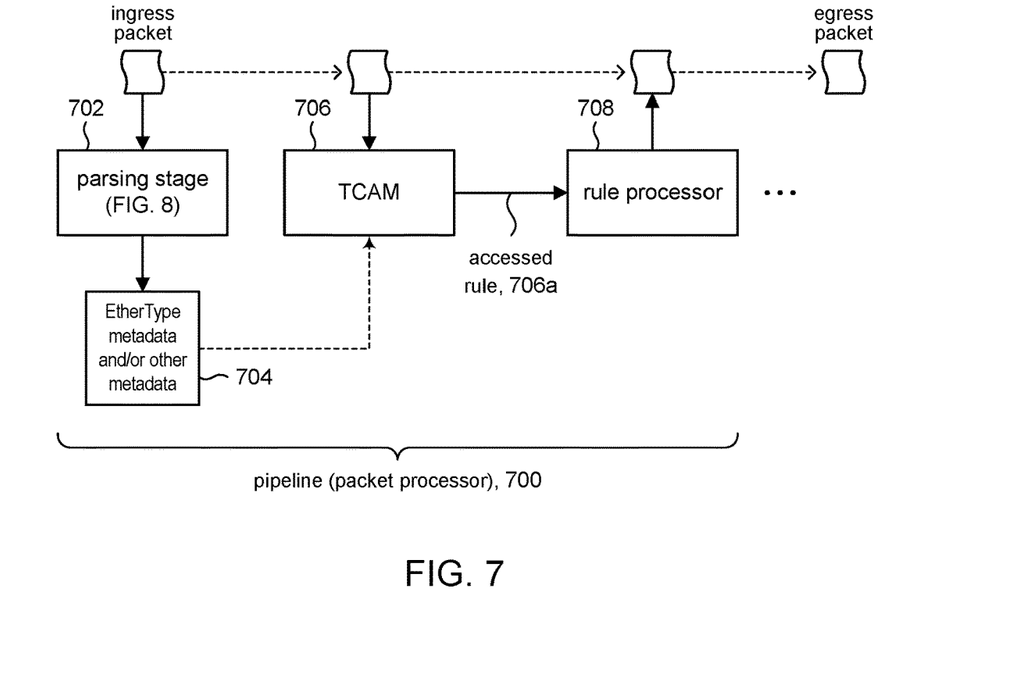
FIG. 7 is a block diagram of an example of a packet processing pipeline.

At operation 602, the packet processor can receive an ingress packet on one of its ports (e.g., 510a). The packet processor can provide the ingress packet to a parsing stage in the processing pipeline of the packet processor. FIG. 7, for example, shows a processing pipeline 700 in the packet processor comprising parsing stage 702 for parsing an ingress packet.

At operation 604, the packet processor can parse the ingress packet in the parsing stage of the processing pipeline. In accordance with some embodiments, the parsing stage can parse (FIG. 8) the EtherType field in the packet and store the parsed EtherType into an EtherType metadata, along with other metadata 704 (FIG. 7) that can be parsed from the ingress packet.

At operation 606, a lookup in TCAM 706 (FIG. 7) can be performed using the EtherType metadata and portions of the ingress packet to identify a rule stored in the TCAM.

At operation 608, an accessed rule 706a (FIG. 7) can be processed by rule processing logic 708 to produce an egress packet. The accessed rule can include actions to direct the rule processing logic to rewrite the ingress packet (e.g., change destination IP), to log information, or to drop the packet, and so on. Rules in accordance with the present disclosure are discussed below.

Figure 8:
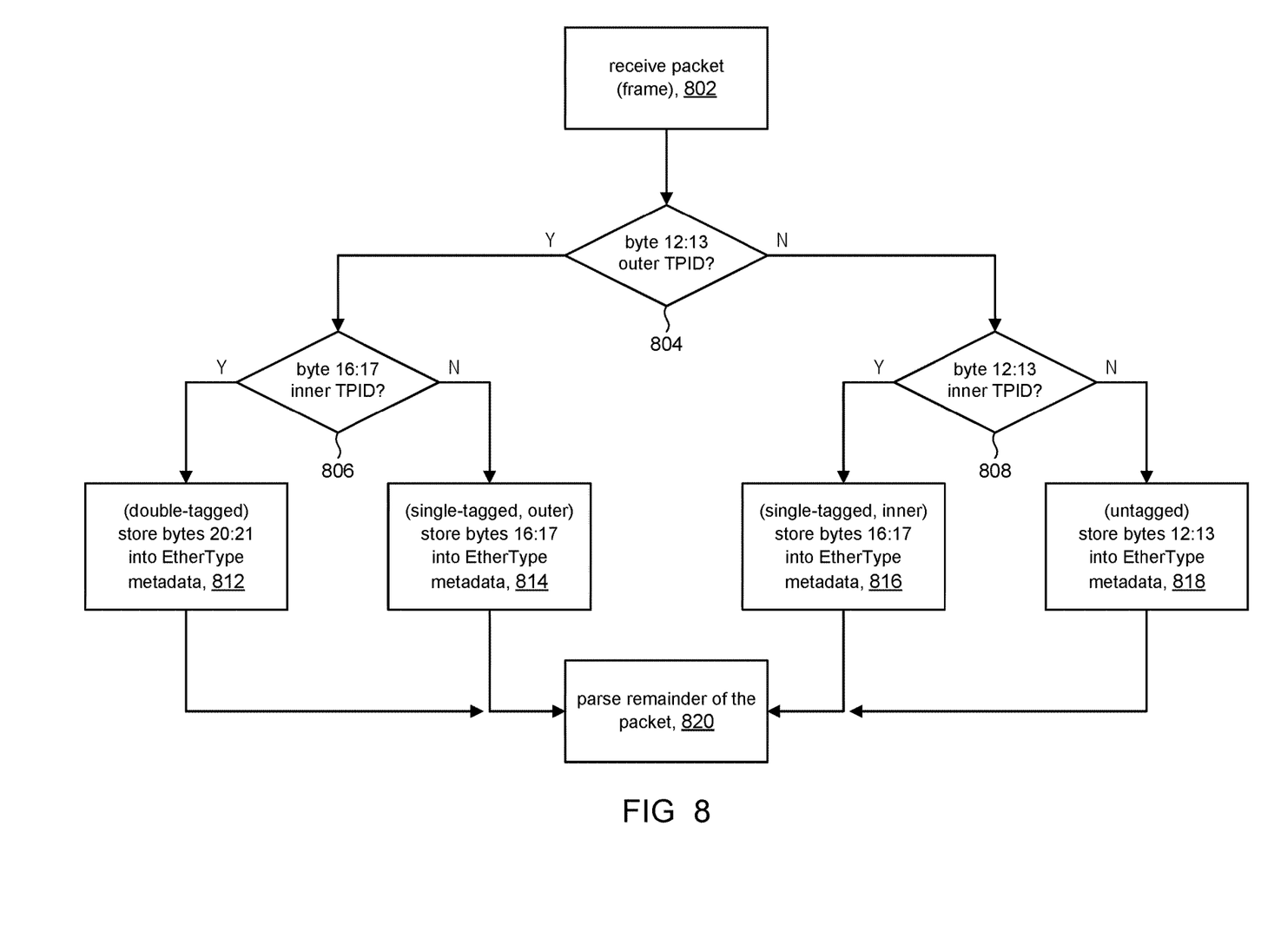
FIG. 8 shows operations for parsing the EtherType from an ingress packet in accordance with some embodiments.

FIG. 8 shows a flow for processing in pipeline 700 (FIG. 7), and in particular parsing stage 702 of the pipeline, to parse an ingress packet and categorize the packet as being untagged (FIG. 1), single-tagged (FIG. 2), or double-tagged (FIG. 3). Pipeline architectures are known; for example, pipeline 700 can comprise a combination of programmed logic (e.g., field programmable gate array, FGPA, logic), microcode, and the like. The operations illustrate how the EtherType field can be parsed for tagged and untagged packets and stored into an EtherType metadata (e.g., in memory 514a in the network device) for further processing downstream in the pipeline.

The tagging category can be based on the TPID(s) contained in the ingress packet. In some embodiments, a TPID can be categorized as being an "outer" TPID or an "inner" TPID. An outer TPID is a TPID that is associated on a port by port basis. Each port on the network device can be configured (e.g., software programmable) by the user with a value for its outer TPID. In some embodiments, a port can be associated with more than one outer TPID. An inner TPID is a TPID that is associated with the chip (e.g., I/O module 506a) as a whole, which in turn associates each port on the chip with that inner TPID. In some embodiments, for example, the inner TPID can be hardwired into the chip; e.g. the inner TPID can be selected using jumpers on the circuit board. Accordingly, the inner TPID can be said to be fixed or otherwise is not configurable by software.

At 802, the processing pipeline can receive an ingress packet. Processing can begin by providing the packet to the parsing stage in the pipeline. The ingress packet can be parsed according to the following:

Double-tagged—In some embodiments, a packet is considered double-tagged when:

bytes 12:13 match one of the outer TPIDs associated with the ingress port (Y branch at decision point 804)

bytes 16:17 match the inner TPID associated with the I/O module that supports the ingress port (Y branch at decision point 806)

Because the two bytes starting at byte 20 are interpreted as containing the Ethertype, byte 20 is the presumed (expected) starting location of the EtherType. Accordingly, the parsing stage will store the two bytes starting at byte 20 into the EtherType metadata (operation 812).

Single-outer-tagged—In some embodiments, a packet is considered single-outer-tagged when:

bytes 12:13 match one of the outer TPIDs associated with the ingress port (Y branch at decision point 804)

bytes 16:17 do NOT match the inner TPID associated with the ingress port's I/O module (N branch at decision point 806)

Because the two bytes starting at byte 16 are interpreted as containing the Ethertype, byte 16 is the presumed (expected) starting location of the EtherType. Accordingly, the parsing stage will store the two bytes starting at byte 16 into the EtherType metadata (operation 814).

Single-inner-tagged—In some embodiments, a packet is considered single-inner-tagged when:

bytes 12:13 do NOT match any of the outer TPIDs associated with the ingress port (N branch at decision point 804)

bytes 16:17 match the inner TPID associated with the ingress port's I/O module (Y branch at decision point 808)

Because the two bytes starting at byte 16 are interpreted as containing the Ethertype, byte 16 is the presumed (expected) starting location of the EtherType.

Accordingly, the parsing stage will store the two bytes starting at byte 16 into the EtherType metadata (operation 816).

Untagged—In some embodiments, a packet is considered untagged when:

bytes 12:13 do NOT match any of the outer TPIDs associated with the ingress port (N branch at decision point 804)

bytes 16:17 do NOT match the inner TPID associated with the ingress port's I/O module (N branch at decision point 808)

Because the two bytes starting at byte 12 are interpreted as containing the Ethertype, byte 12 is the presumed (expected) starting location of the EtherType. Accordingly, the parsing stage will store the two bytes starting at byte 12 into the EtherType metadata (operation 818).

At operation 820, the processing pipeline can process the remainder of the packet to parse other metadata, and so on. In some embodiments, for example, when the packet is considered to be double-tagged, operation 820 can include additional processing to detect a triple-tagged packet (e.g., FIG. 4). For example, when a packet is deemed to be double-tagged the processing pipeline can parse for another TPID. If the processing pipeline parses a TPID=0x88a8 or 0x8100 or 0x9100, the packet can be deemed to be triple-tagged and the processing pipeline can indicate the occurrence of such a packet, for example, by via appropriate pipeline metadata. Basically, a triple-tagged packet=double-tagged packet+next TPID=0x88a8 or 0x8100 or 0x910

The discussion will now turn to examples of properly formed and malformed (improperly formed) VLAN packets.

Consider the packets shown in FIGS. 1, 2, and 3, which are deemed to be properly formed VLAN packets. Suppose they are received on a given port on the network device, and assume without loss of generality that the outer TPID for the given port is 0x8a88 and the I/O module (chip) to which the port is connected is programmed with an inner TPID of 0x8100. Applying the parsing sequence of FIG. 8 to the packets shown in FIGS. 1, 2, and 3, it can be seen that:

The packet in FIG. 1 will be categorized as an untagged packet because bytes 12:13 are not equal to either the outer TPID (0x8a88) or the inner TPID (0x8100). The parser will parse the data at bytes 12:13 as the EtherType and set the EtherType metadata to the correct value of 0x800. In other words, bytes 12:13 are interpreted as containing the EtherType.

The packet in FIG. 2 will be categorized as single-tagged packet, and in particular as a single-inner-tagged packet, because bytes 12:13 are not equal to the outer TPID (0x8a88) but is equal to the inner TPID (0x8100). The parser will parse the data at bytes 16:17as the EtherType and set the EtherType metadata to the correct value of 0x800. In other words, bytes 16:17 are interpreted as containing the EtherType.

The packet in FIG. 3 will be categorized as a double-tagged packet because bytes 12:13 are equal to the outer TPID (0x8a88) and bytes 16:17 are equal to the inner TPID (0x8100). The parser will parse the data at bytes 20:21 as the EtherType and set the EtherType metadata to the correct value of 0x800. In other words, bytes 20:21 are interpreted as containing the EtherType.

We now consider examples of packets with malformed TPID configurations to illustrate how such packets can affect parsing of the EtherType metadata.

Figure 9:
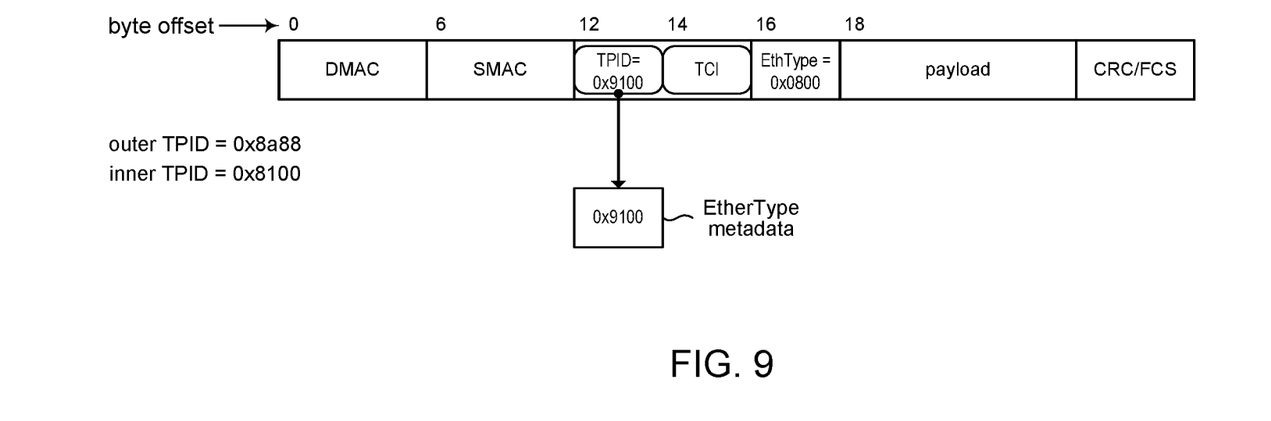
FIGS. 9-12 illustrate examples of malformed VLAN packets.

FIG. 9 shows an example of a malformed packet received on a port configured with outer TPID 0x8a88, on a chip programmed with inner TPID 0x8100. The packet has the format of a single-tagged VLAN packet, where the Ethertype is at bytes 16:17. However, per the flow in FIG. 8, the packet will be mis-categorized as an untagged packet. The packet does not appear to the parser as a VLAN packet because bytes 12:13 of the packet hold the value 0x9100 which does not match the outer TPID (0x8a88) or the inner TPID (0x8100). Accordingly, the packet appears to the parser as an untagged packet (see FIG. 1) and will set the EtherType metadata according to the content of bytes 12:13 (per operation 818) where the EtherType is located for untagged packets. However, bytes 12:13 in the packet in FIG. 9 contains 0x9100 and so the EtherType metadata will be set to 0x9100. Accordingly, any security ACLs or other security measures that target VLAN packets will be bypassed because the expected TPIDs were not detected. Absent suitable L2 security measures, the malformed packet (whether unintentional or intentional with malicious intent) may then be forwarded onto the next hop and into the network, thus putting the network at risk.

Figure 10:
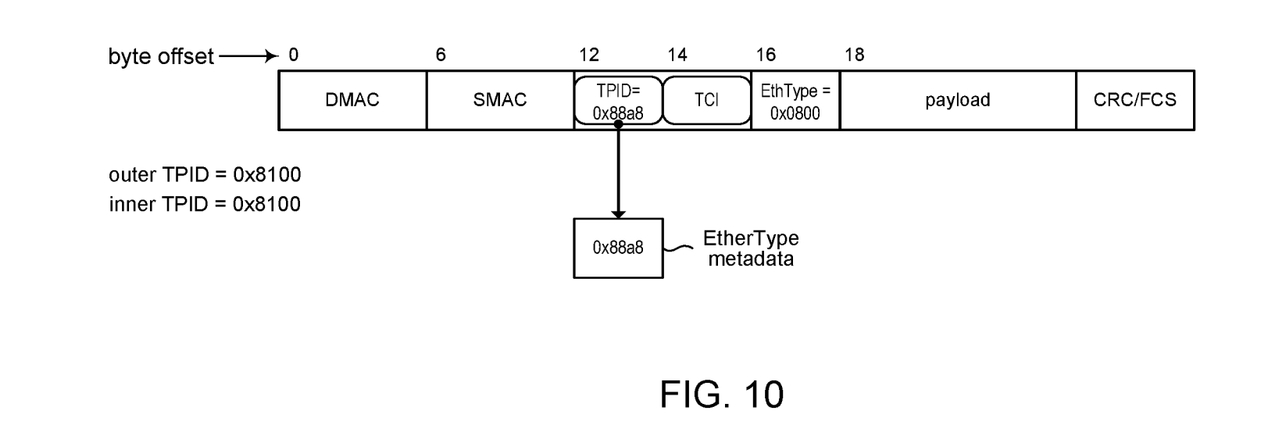

FIG. 10 shows another example of a malformed packet received on a port configured with outer TPID 0x8100, on a chip programmed with inner TPID 0x8100. Again, the packet has the format of a single-tagged VLAN packet. Again, per the flow in FIG. 8, the packet will be mis-categorized as an untagged packet because bytes 12:13 of the packet (0x88a8) do not match either the outer TPID (0x8100) or the inner TPID (0x8100), and so the parser will not recognize the packet as being a VLAN packet but rather as an untagged packet. The EtherType metadata will be incorrectly set to the data at bytes 12:13, namely 0x8a88, at operation 818.

Figure 11:
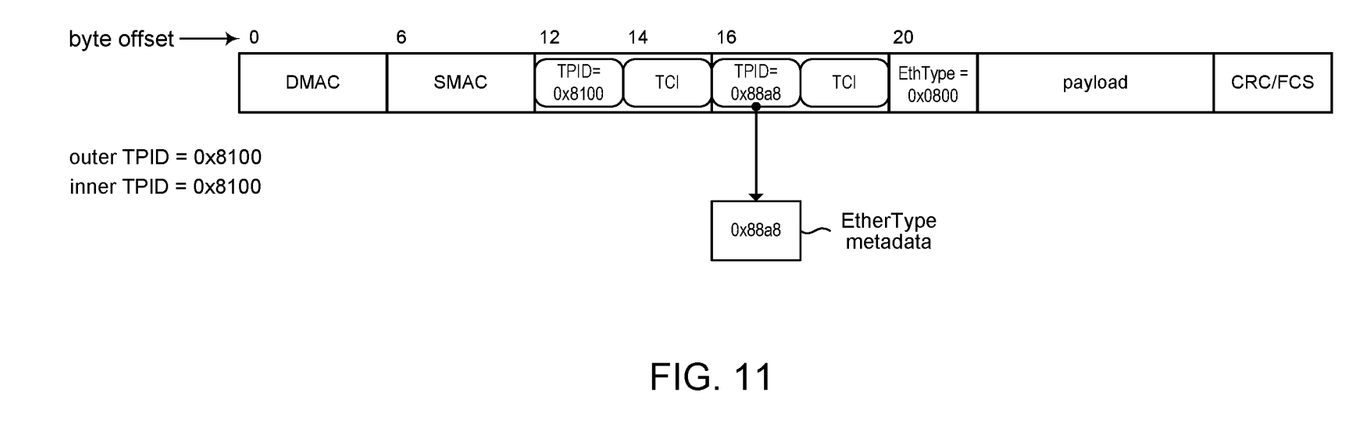

FIG. 11 shows a malformed packet received on a port configured with outer TPID 0x8100, on a chip programmed with inner TPID 0x8100. The packet has the format of a double-tagged VLAN packet. Per the flow in FIG. 8, however, the packet will be mis-categorized as a single-outer-tagged packet because bytes 12:13 of the packet (0x8100) match the outer TPID (0x8100) and bytes 16:17 of the packet (0x88a8) do not match the inner TPID (0x8100). The packet appears to the parser as a single-tagged VLAN packet (see FIG. 2, for example) and consequently expects the EtherType to be at bytes 16:17. Accordingly, the parser will set the EtherType metadata to the value at data at bytes 16:17, which in FIG. 11 is 0x8a88 (operation 814).

Figure 12:
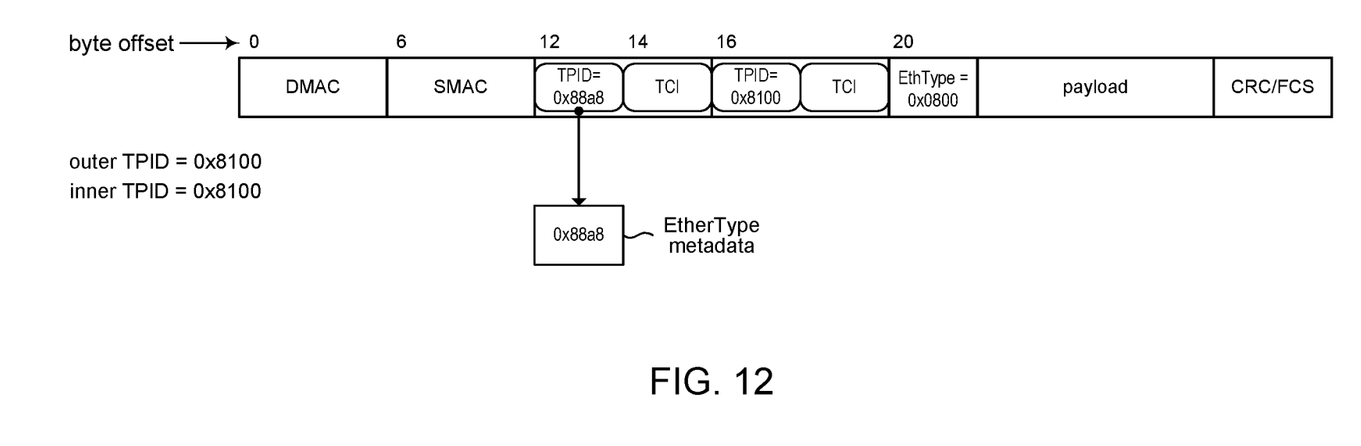

FIG. 12 shows a malformed packet received on a port configured with outer TPID 0x8100, on a chip programmed with inner TPID 0x8100. The packet appears to be a double-tagged VLAN packet. Per the flow in FIG. 8, however, the packet will be mis-categorized. Because bytes 12:13 of the packet (0x88a8) do not match the outer TPID (0x8100) nor the inner TPID (0x8100), the parser will miscategorize the packet as being an untagged packet. The parser will set the EtherType metadata to the data at bytes 12:13, where the EtherType is expected to be located for an untagged packet. However, bytes 12:13 in the example shown in FIG. 12 contain 0x8a88, instead of 0x0800 (the EtherType for IPV4).

In accordance with the present disclosure, malformed VLAN packets can be detected by programming suitable rules in the TCAM. In some embodiments, for example, the TCAM rule(s) can match on the parsed EtherType metadata. More specifically, in some embodiments, the match can be based on the EtherType metadata being set to a value equal to a VLAN TPID, such as 0x8100 (dot1q), 0x88a8 (dotlad), rather than being set to a standard EtherType (e.g., 0x0800 for IPV4, 0x86dd for IPV6). In some embodiments, the match can be based on VLAN metadata parsed from the ingress packet, in addition to or instead of the parsed EtherType metadata. In some embodiments, for example, the match can be based on the VLAN ID contained in the ingress packet.

Figure 13:
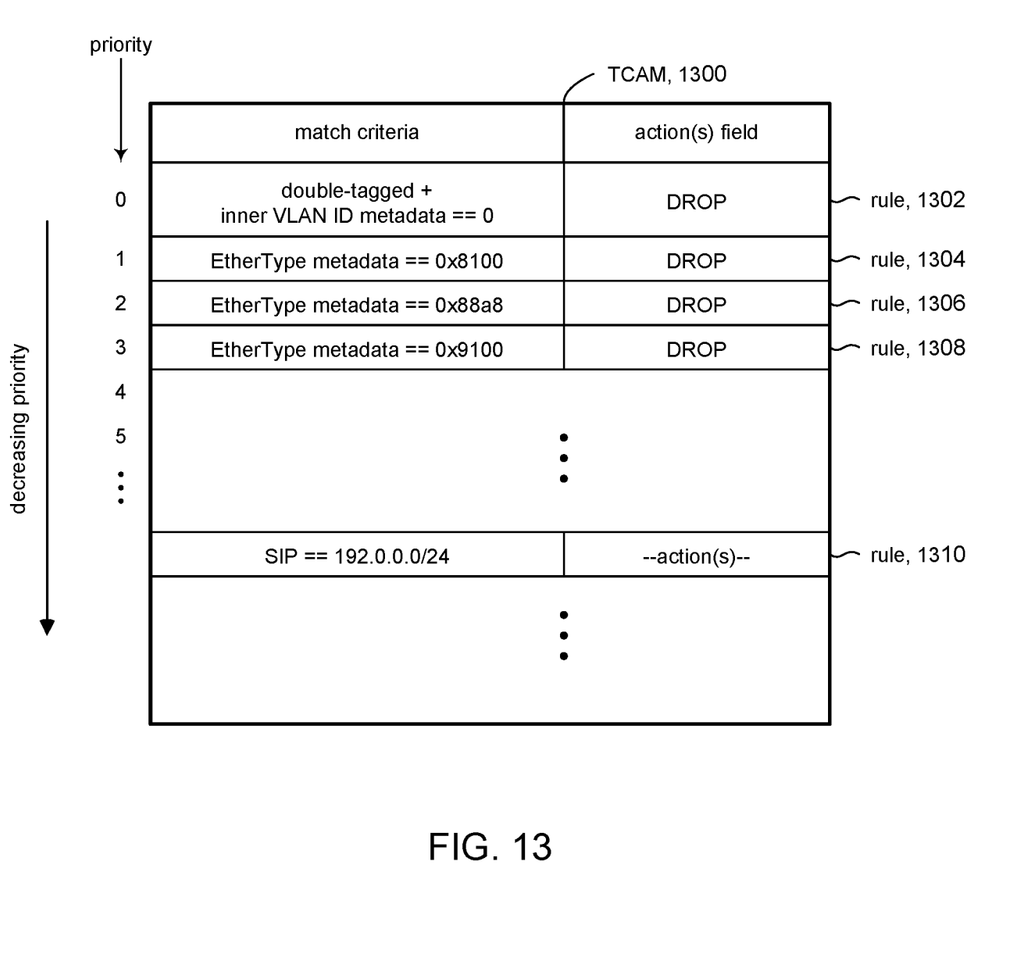
FIG. 13 shows an example of a TCAM in accordance with some embodiments.

FIG. 13 shows a TCAM 1300 configured with rules defined in accordance with some embodiments. TCAMs and TCAM rules are known. Briefly, a TCAM rule comprises match criteria for matching packets and one or more actions that are invoked when the match criteria are met. The match criteria can match various data in a packet, including for example source and destination addresses, source and destination ports, protocol type, data in the payload, and so on. The match criteria can match metadata parsed from the packet; e.g., the EtherType metadata. Action(s) include dropping a packet, redirecting a packet, rewriting one or more fields in a packet, logging a message, and so on. For discussion purposes, a TCAM rule can be expressed or represented in the form of an IF-THEN statement:

IF<condition(s) are met>, THEN <perform action(s)>
where the conditions in the IF portion represent one or more match criteria and the THEN portion expresses the action(s) performed on a matched packet.

Rules (e.g., 1302, 1304) are ordered in TCAM 1300 from top to bottom in decreasing priority. Rule 1302 has higher priority than rule 1304, rule 1304 has priority than rule 1306, and so on. TCAMs and their operation are very well known and understood. Briefly, when a TCAM lookup is performed, the first rule (starting with the highest priority rule) that matches on the ingress packet contents and/or corresponding metadata will be invoked, and the corresponding action(s) performed. No further rules in the TCAM are matched; the packet continues to the next stage in the packet processing pipeline.

Depending on the rule, the rule can match on contents of the ingress packet as the match criteria (e.g., source and destination MAC address, etc.), the rule can match on metadata parsed in the parsing stage (e.g., EtherType metadata) as the match criteria, or the rule can match on a combination of packet contents and metadata. Each of rules 1302-1310, for example, matches on metadata, whereas rule 1310 matches on the packet content.

As shown by the foregoing examples, when a packet with malformed TPID(s) is parsed, the Ethertype metadata can be set to a TPID value (e.g., 0x8100, 0x88a8, etc.) rather than to a valid EtherType value (e.g., 0x0800, 0x86dd, etc.). TCAM rules can be defined to identify such packets. Rules 1304-1308, for example, match on the EtherType metadata being set to a TPID value; packets matching one of these rules will be DROPPED, logged, and so on. It will be appreciated that in some embodiments, instead of matching the EtherType metadata to a TPID, the rule can match on:

EtherType!=0x0800, then DROP

However, because typical TCAMs cannot express the not equal (!=) operation with a single rule, embodiments, can check if EtherType==0x8100 or if EtherType==0x88a8 or if EtherType==0x9100, instead.

Rule 1302 shows that malformed packets can be identified based on VLAN ID being a certain value; e.g., VLAN ID==0; such packets are sometimes referred to as priority tagged packets. For example, DMAC SMAC 0x8100 0002 0x8100 0000 ETHERTYPE PAYLOAD, is a double-tagged packet where the first VLAN tag is TPID=0x8100, VLAN=2 and the second VLAN tag (priority tag) is TPID=0x8100, VLAN=0. Accordingly, malformed packets can be prevented from propagating any further into the network, avoiding potential security breaches.

TCAM 1300 is programmed with rules for dropping packets. These rules represent a DENY list. It will be appreciated that the TCAM can be programmed with a PERMIT list (not shown) that allows packets to be forwarded.

In some embodiments, for example in strictly private deployments, the network can transmit custom network packets defined according to internal formats using user-defined fields (UDFs) that do not necessarily conform to IEEE standard formats. Although UDFs can still use the same TPID values and EtherType values defined in the IEEE standards, the start position of the TPID and EtherType values in the packet may not be at the standard byte positions (e.g. 12, 16, 20), depending on how where the UDFs are located in the custom network packets. In some embodiments, the pipeline can include an additional parsing stage to parse the packet and store parsed UDFs into corresponding UDF metadata. For example, a UDF may be defined to store a VLAN tag, but rather than starting at byte 12 (e.g., see FIG. 2), the UDF may start at some other byte location in the packet. Accordingly, in some embodiments, the TCAM rules can match on UDF metadata parsed by the parsing stage.

Figure 14:
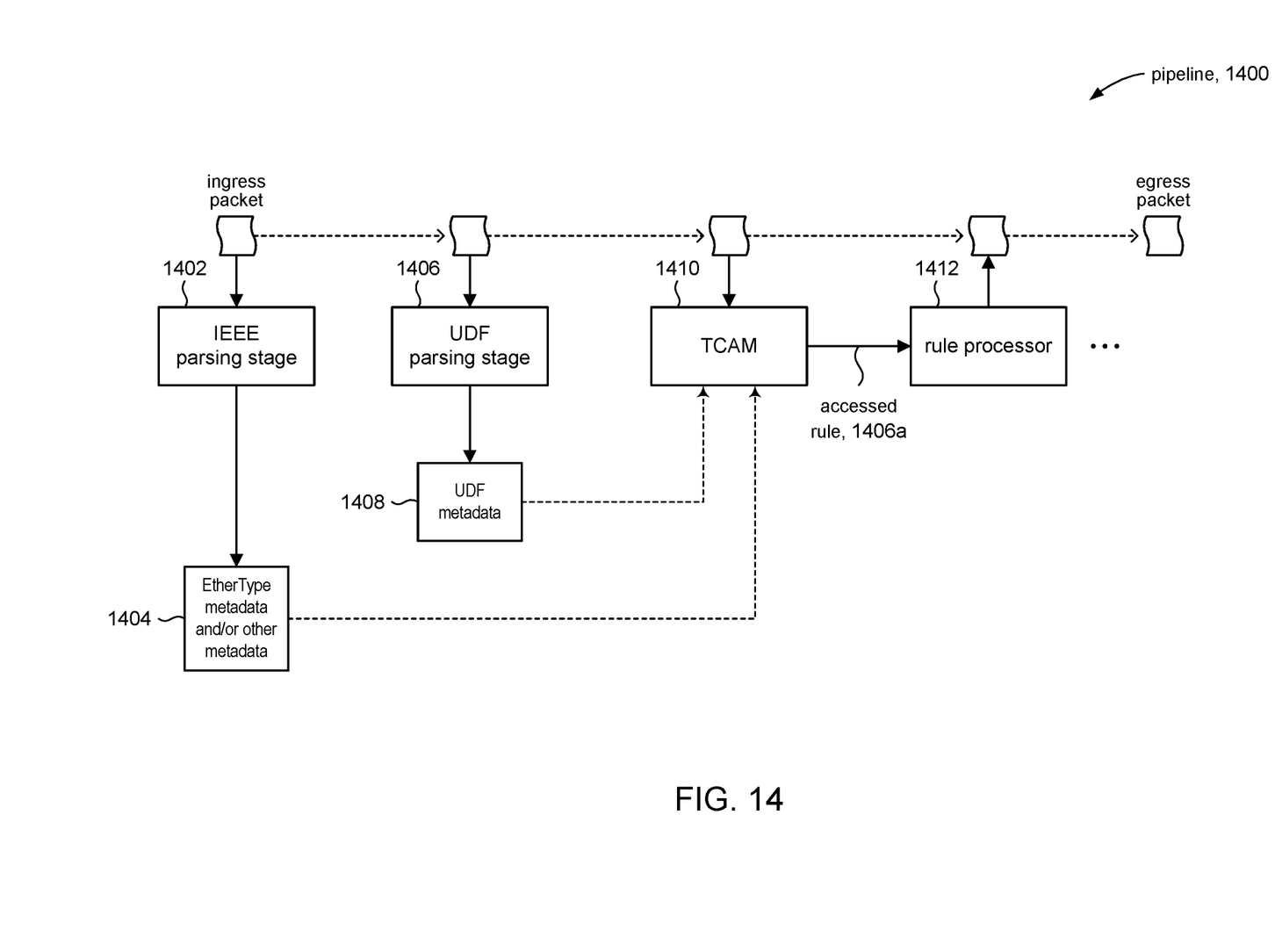
FIG. 14 is an example of a block diagram of a packet processing pipeline that includes a parser for UDFs.

FIG. 14 shows a pipeline 1400 comprising a parsing stage 1402 to parse the ingress packet according to IEEE standards. Parsing stage 1402 can parse standards-based metadata 1404 such as the EtherType. Pipeline 1400 can include a UDF parsing stage 1406 to parse UDF-defined fields in the packet to produce UDF metadata 1408. Standard metadata 1404 and UDF metadata 1408 can be used to match on a rule in TCAM 1410. A matched rule can then be processed by rules processor 1412 to produce the egress packet.

Figure 15:
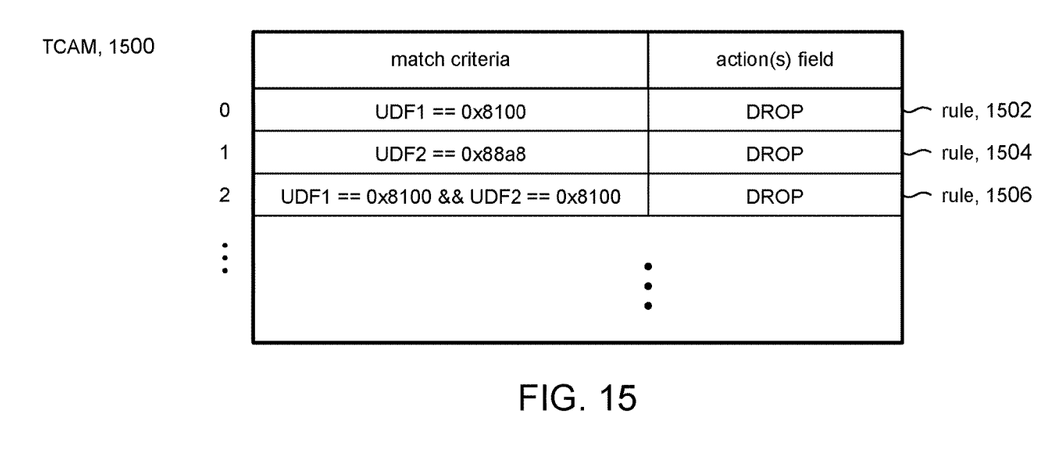
FIGS. 15 and 16 show TCAM examples that incorporate rules using UDFs.

FIG. 15 shows an example of a TCAM 1500 having rules based on UDF metadata 1408 as the match criteria. The rules can be based on matching one UDF (e.g., rules 1502, 1504) or multiple UDFs (e.g., rule 1504). The rules can match on the UDF metadata having certain TPID values (e.g., 0x8100, 0x88a8, etc.).

Figure 16:
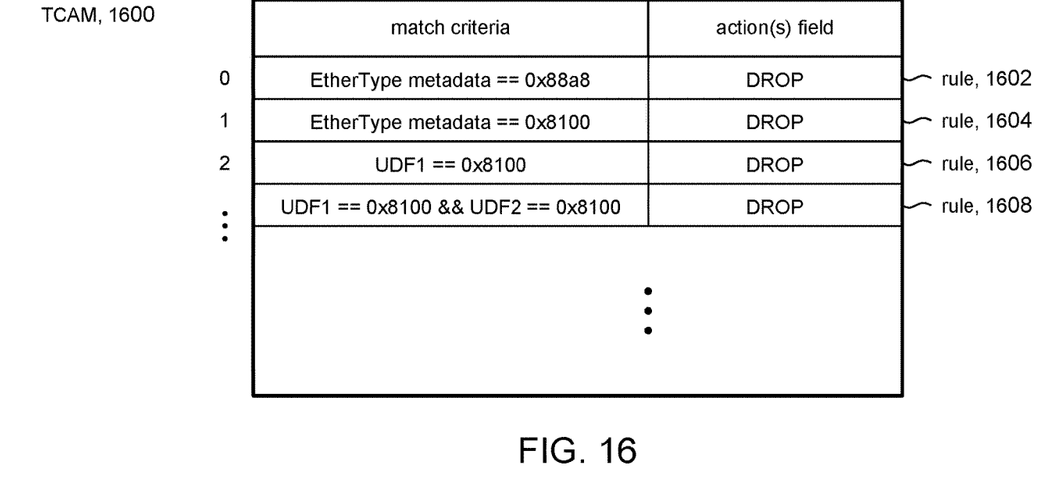

FIG. 16 shows an example of a TCAM 1600 that is configured with rules to accommodate a parsing stage that can parse IEEE conforming packets (e.g., 1402, FIG. 14) and a parsing stage (e.g., 1406) to parse non-conforming packets having UDFs. If an IEEE conforming packet is parsed, then rules 1602,1604 may be matched. If non-conforming packets are parsed, then rules 1602, 1604 may not be matched because the UDFs containing any VLAN information of interest may be found elsewhere in the packet. However, rules 1606, 1608 may be matched.

FURTHER EXAMPLES

In accordance with the present disclosure, a method in a network device to detect and filter virtual local area network (VLAN) packets, comprises: receiving an ingress packet, the ingress packet containing one or more VLAN tags; determining a starting byte position in the ingress packet based on the one or more VLAN tags contained in the packet; storing into a data store data beginning at the starting byte position in the ingress packet; using data stored in the data store to identify a matched rule among a plurality of rules stored in a memory of the network device; and in response to identifying a matched rule, processing the ingress packet in accordance with one or more actions associated with the matched rule, wherein the one or more actions includes dropping the ingress packet.

In some embodiments, the starting byte position in the ingress packet is determined based on tag protocol identifiers (TPIDs) in the one or more VLAN tags.

In some embodiments, the data beginning at the starting byte position in the ingress packet is interpreted to contain a protocol that describes data contained in a payload of the ingress packet.

In some embodiments, the matched rule is identified when the data in the data store does not represent a protocol that describes data contained in a payload of the ingress packet. In some embodiments, the matched rule is identified when the data in the data store is a tag protocol identifier (TPID) value instead of a protocol that describes the data contained in the payload of the ingress packet.

In some embodiments, the matched rule is identified when the data store contains a TPID value.

In some embodiments, the matched rule is the highest priority rule among a plurality of rules.

In accordance with the present disclosure, a network device comprises: at least one packet processor; and a computer-readable storage medium comprising executable code for controlling the at least one packet processor to: receive an ingress packet comprising one or more VLAN tags and a payload portion; determine a location in the ingress packet based on the one or more VLAN tags in the packet; drop the ingress packet when data beginning at the determined location in the ingress packet does not represent a protocol that describes data in the payload portion; and forward the ingress packet when the data beginning at the determined location in the ingress packet represents a protocol that describes the data in the payload portion.

In some embodiments, the data beginning at the determined location in the ingress packet is interpreted to represent a protocol that describes the data in the payload portion.

In some embodiments, the determined location in the ingress packet is determined based on tag protocol identifiers (TPIDs) in the one or more VLAN tags.

In some embodiments, the ingress packet comprises a plurality of user-defined fields (UDFs), wherein the VLAN tags are located among the UDFs.

In some embodiments, the network device further comprises a memory having stored therein a plurality of rules. The computer-readable storage medium further comprises executable code for controlling the at least one packet processor to: store into a data store the data beginning at the determined location in the ingress packet; use the data stored in the data store to identify a rule from among the plurality of rules; and process the ingress packet in accordance with one or more actions associated with the identified rule, wherein the one or more actions includes dropping the ingress packet. In some embodiments, the identified rule is identified when the data in the data store is a tag protocol identifier (TPID) value. In some embodiments, the identified rule is identified when a VLAN ID in one of the VLAN tags is equal to 0. In some embodiments, the identified rule is the highest priority rule among a plurality of rules.

In accordance with the present disclosure, a network device comprises: at least one packet processor; a content addressable memory having stored therein a plurality of first rules; and a computer-readable storage medium comprising executable code for controlling the at least one packet processor to: receive an ingress packet comprising one or more VLAN tags; store into a data store content in the ingress packet identified based on the one or more VLAN tags in the packet; identify a rule from among the plurality of first rules using data stored in the data store; and process the ingress packet in accordance with one or more actions associated with the identified rule, wherein the plurality of first rules comprise match criteria that match on VLAN tag data.

In some embodiments, the one or more actions associated with the identified rule includes dropping the ingress packet.

In some embodiments, the plurality of first rules are the highest priority rules in the content addressable memory.

In some embodiments, at least one of the plurality of first rules matches on the data in the data store being a TPID value.

In some embodiments, at least one of the plurality of first rules matches on a VLAN ID in one of the VLAN tags being equal to 0.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device to detect and filter virtual local area network (VLAN) packets, the method comprising:
   receiving an ingress packet, the ingress packet containing one or more VLAN tags;

identifying a VLAN tag in the ingress packet;
using the identified VLAN tag to access data in the ingress packet, wherein when the identified VLAN tag has a first value, the data is at a first location in the ingress packet, wherein when the identified VLAN tag has a second value, the data is at a second location in the ingress packet different from the first location;
using the data to identify a matched rule among a plurality of rules stored in a memory of the network device; and
processing the ingress packet in accordance with one or more actions associated with the matched rule, wherein the one or more actions includes dropping the ingress packet.

2. The method of claim 1, wherein a starting byte position of the data in the ingress packet is determined based on a tag protocol identifier (TPID) in the VLAN tag.

3. The method of claim 1, wherein the data in the ingress packet is interpreted to contain a protocol that describes data contained in a payload of the ingress packet.

4. The method of claim 1, wherein the matched rule is identified when the data does not represent a protocol that describes data contained in a payload of the ingress packet.

5. The method of claim 4, wherein the matched rule is identified when the data is a tag protocol identifier (TPID) value instead of a protocol that describes the data contained in the payload of the ingress packet.

6. The method of claim 1, wherein the matched rule is identified when the data contains a TPID value.

7. The method of claim 1, wherein the matched rule is the highest priority rule among a plurality of rules.

8. A network device comprising:
at least one packet processor; and
a computer-readable storage medium comprising executable code for controlling the at least one packet processor to:
receive an ingress packet comprising at least one VLAN tag and a payload portion;
use the VLAN tag to identify a location in the ingress packet, wherein the location in the ingress packet begins at a first byte position when the VLAN tag has a first value and at a second byte position different from the first byte position when the VLAN tag has a second value; and
use data beginning at the identified location to process the ingress packet, including:
dropping the ingress packet when the data does not represent a protocol that describes data in the payload portion; and
forwarding the ingress packet when the data represents a protocol that describes the data in the payload portion.

9. The network device of claim 8, wherein the data beginning at the identified location in the ingress packet is interpreted to represent a protocol that describes the data in the payload portion.

10. The network device of claim 8, wherein the identified location in the ingress packet is determined based on tag protocol identifiers (TPIDs) in the one or more VLAN tags.

11. The network device of claim 8, wherein the ingress packet comprises a plurality of user-defined fields (UDFs), wherein the VLAN tags are located among the UDFs.

12. The network device of claim 8, further comprising a memory having stored therein a plurality of rules, wherein the computer-readable storage medium further comprises executable code for controlling the at least one packet processor to:
store into a data store the data beginning at the identified location in the ingress packet;
use the data stored in the data store to identify a rule from among the plurality of rules; and
process the ingress packet in accordance with one or more actions associated with the identified rule, wherein the one or more actions includes dropping the ingress packet.

13. The network device of claim 12, wherein the identified rule is identified when the data in the data store is a tag protocol identifier (TPID) value.

14. The network device of claim 12, wherein the identified rule is identified when a VLAN ID in one of the VLAN tags is equal to 0.

15. The network device of claim 12, wherein the identified rule is the highest priority rule among a plurality of rules.

16. A network device comprising:
at least one packet processor;
a content addressable memory having stored therein a plurality of first rules; and
a computer-readable storage medium comprising executable code for controlling the at least one packet processor to:
receive an ingress packet comprising at least one VLAN tag;
use the VLAN tag to identify a location in the ingress packet, wherein the location in the ingress packet begins at a first byte position when the VLAN tag has a first value and at a second byte position different from the first byte position when the VLAN tag has a second value;
use data at the identified location to identify a rule among the plurality of first rules; and
process the ingress packet in accordance with one or more actions associated with the identified rule,
wherein the plurality of first rules comprise match criteria that match on VLAN tag data.

17. The network device of claim 16, wherein the one or more actions associated with the identified rule includes dropping the ingress packet.

18. The network device of claim 16, wherein the plurality of first rules are the highest priority rules in the content addressable memory.

19. The network device of claim 16, wherein at least one of the plurality of first rules matches on the data in the data store being a TPID value.

20. The network device of claim 16, wherein at least one of the plurality of first rules matches on a VLAN ID in one of the VLAN tags being equal to 0.

* * * * *